United States Patent
Hamamura et al.

(10) Patent No.: US 6,698,507 B2
(45) Date of Patent: Mar. 2, 2004

(54) ALUMINUM ALLOY HEAT EXCHANGER RESISTIVE TO TOBACCO ODOR IMPREGNATION

(75) Inventors: Kazunari Hamamura, Tokyo (JP); Kengo Kobayashi, Nagoya (JP); Hiroyoshi Sugawara, Anjo (JP); Osamu Kasebe, Okazaki (JP); Kazuhisa Uchiyama, Nagoya (JP)

(73) Assignees: Nihon Parkerizing Co., Ltd., Tokyo (JP); Denso Corporation, Aichi-Pref (JP)

(*) Notice: Subject to any disclaimer, the term of this patent is extended or adjusted under 35 U.S.C. 154(b) by 0 days.

(21) Appl. No.: 10/334,912

(22) Filed: Jan. 2, 2003

(65) Prior Publication Data

US 2003/0150600 A1 Aug. 14, 2003

(30) Foreign Application Priority Data

Jan. 11, 2002 (JP) ........................ 2002-005163

(51) Int. Cl.[7] ............... F28F 13/18; F28F 19/00; C08B 37/08
(52) U.S. Cl. ................. 165/133; 165/134.1; 536/20
(58) Field of Search ............... 165/133, 134.1, 165/905; 536/20

(56) References Cited

U.S. PATENT DOCUMENTS 5,521,292 A * 5/1996 Ueda et al. ............... 536/2
5,538,078 A * 7/1996 Mizuno et al. ............ 165/133
6,013,275 A * 1/2000 Konagaya et al. ........ 424/443
6,403,224 B1 * 6/2002 Okajima et al. ......... 428/423.7

FOREIGN PATENT DOCUMENTS

| EP | 0 911 427 A1 | 4/1999 |
| EP | 1 205 523 A1 | 5/2002 |
| JP | 1-270977 | 10/1989 |
| JP | 1-299877 | 12/1989 |
| JP | 2-258874 | 10/1990 |
| JP | 6-306247 | 11/1994 |
| JP | 407190676 A * | 7/1995 |
| JP | 8-296992 | 11/1996 |
| JP | 411293149 A * | 10/1999 |
| JP | 02002206894 A * | 7/2002 |

* cited by examiner

*Primary Examiner*—Henry Bennett
*Assistant Examiner*—Tho V Duong
(74) *Attorney, Agent, or Firm*—Nixon & Vanderhye P.C.

(57) ABSTRACT

An aluminum alloy heat exchanger having excellent hydrophilicity and resistance to absorption or impregnation of tobacco odorous components has an organic hydrophilic coating layer formed on at least a portion of a base body of the heat exchanger and containing (A) at least one chitosan compound, (B) at least one two or more carboxyl group-containing organic compound and (C) at least one hydrophilic polymeric substance different from the components (A) and (B), in which the total solid content of components (A) and (B) is 20 mass % or more and the solid content of component (C) is 0.1 to 10 mass %.

6 Claims, 1 Drawing Sheet

ALUMINUM ALLOY HEAT EXCHANGER RESISTIVE TO TOBACCO ODOR IMPREGNATION

TECHNICAL FIELD

The present invention relates to an aluminum alloy heat exchanger resistive to tobacco odor impregnation, absorption and sticking. In particular, the present invention relates to an aluminum alloy heat exchanger with a coating having a reduced absorption of the odorous components of tobacco, etc.

BACKGROUND ART

When an aluminum alloy heat exchanger usable as an air conditioner for a motor car is operated, condensed water adheres to the surfaces of fins. When the fin surfaces have a low wetting property, the condensed water forms water droplets substantially in the form of semispheres on the fin surfaces, or water bridges are formed between the fin surfaces. The semispheric water drops and the water bridges form resistance to airflow and other problems, for example, a reduction in heat exchange efficiency and generation of noise. In the prior art for solving the above-mentioned disadvantages, an organic hydrophilic coating is usually formed on the surface of the heat exchanger. For example, Japanese Unexamined Patent Publication No. 1-299,877 discloses a coating formed from a combination of polyvinyl alcohol with a specific water-soluble polymer and a cross-linking agent, Japanese Unexamined Patent Publication No. 1-270,977 discloses use of polyacrylamide resins, Japanese Unexamined Patent Publication No. 6-306,247 discloses copolymerization of specific hydrophilic monomers, and Japanese Patent No. 2520308 (JP-A-2-258874) discloses use of organic hydrophilic treating agents comprising carboxymethylcellulose polymers, N-methylolacrylamide, polyacrylic acid and a zirconium compound.

It is also known that odorous components contained in the ambient atmospheric air or air contained in the heat exchanger are absorbed by the condensed water adhered to the surface of the heat exchanger and are gradually accumulated on the heat exchanger surface over time, and then the odorous components are released from the heat exchanger surface during operation of the air conditioner, and give off an offensive odor.

As a method for deodorizing the heat exchanger, it is well known to employ activated carbon. In this method, the activated carbon is shaped into pellets or a honeycomb, and the odorous components in air are absorbed in fine pores formed in the surface portions of the shaped activated carbon by diffusion or circulation or ventilation of the odorous component-carrying air through the heat exchanger.

In other deodorizing methods not using the absorption procedure, the absorbing material is reactivated by an electric heating procedure. In this method, an absorbing material and a noble metal oxide catalyst are carried on a surface of a heating resistor, while the absorbing material has a satisfactory absorbing activity, the absorbing material is used for deodorizing purposes at room temperature, and when the absorbing activity of the absorbing material becomes insufficient, the heating resistor is electrically activated to heat the absorbing material to a temperature of 300° C. or more, and to oxidatively decompose the odorous components absorbed in the absorbing material, and to reactivate the absorbing material.

Also, as a technology for activating a heat exchanger surface, Japanese Unexamined Patent Publication No. 8-296,992 discloses a heat exchanger utilizing a photocatalyst. In this heat exchanger, a mixture of a photocatalyst with a binder is coated on the surfaces of heat exchanging aluminum fins, an ultraviolet ray lamp is arranged so that ultraviolet rays can be irradiated toward the heat exchanger. When the photocatalyst-containing coating is irradiated by the ultraviolet rays, the adhesion and accumulation of the odorous components on the heat exchanger surface can be reduced.

Among the above-mentioned deodorizing methods, the methods using the absorption activity have the following problems. When activated carbon is used, the deodorizing activity of the activated carbon decreases with an increase in the amount of the absorbed odorous components, with the activated carbon finally being saturated by the absorbed odorous components and ceasing to have a deodorizing activity. Sometimes, activated carbon saturated by the odorous component itself becomes a source of generation of the offensive odor. Also, when the deodorizing material is placed in an air conditioner in practice, the space velocity is too high, and thus the time of contact of the odorous component-containing gas with the deodorizing material is insufficient, the degree of deodorization of the deodorizing material per pass of the odorous component-containing gas is low, and thus the resultant deodorization effect is insufficient. To improve the above-mentioned method, it is necessary to decrease the space velocity and to increase the deodorizing activity. However, to satisfy this requirement, the absorbing material and a certain carrier for the absorbing material must be formed into a large-scale honeycomb, and this causes the cost of the absorbing material to increase.

In the deodorizing method in which the absorbing material is reactivated by electrical heating, replacement of the absorbing material is not necessary. However, for the purpose of reactivation, the absorbing material must be heated to a temperature of about 300° C. or more, which may cause the absorbing material to be unnecessarily heated to a high temperature and the environs of the absorbing material to become dangerous.

When the photocatalyst as disclosed in Japanese Unexamined Patent Publication No. 8-296,992 is employed, the necessary ultraviolet ray lamps cause the method cost to increase, and a new problem in that intermediate decomposition products of the odorous components produced in the presence of the photocatalyst may be a source of offensive odor.

DISCLOSURE OF THE INVENTION

An object of the present invention is to provide an aluminum alloy heat exchanger resistive to impregnation, absorption and sticking of tobacco odor or other odorous components, to solve the above-mentioned problems of the prior art.

The inventors of the present invention conducted extensive research in order to find solutions for the above-mentioned problems and, as a result, found that the amount of an odorous component such as tobacco odor absorbed in the surface of a heat exchanger can be significantly reduced by coating the surface of the heat exchanger with a coating layer comprising (A) at least one chitosan compound selected from chitosan and derivatives thereof and (B) at least one carboxylic compound having at least two carboxyl groups per molecule of the compound, the total solid amount (A)+(B) of the chitosan compound component (A) and the carboxylic component (B) being 20% by mass, based on the total amount by mass of the coating layer. Also, it was found by the inventors of the present invention that the hydroplicity of the organic hydrophilic coating layer and the prevention property for absorption of the odorous component by the organic hydrophilic coating layer can be further enhanced by adding a hydrophilic polymeric substance different from the chitosan compound (A) and the carboxylic compound (B), as a component (C) into the organic hydrophilic coating layer, a solid content in the range of from 0.1 to 10% by mass. The present invention has been completed on the basis of the above-mentioned findings.

The aluminum alloy heat exchanger of the present invention resistive to tobacco odor impregnation, comprises a base body of aluminum alloy heat exchanger and an organic hydrophilic coating layer formed on at least a portion of the surface of the base body, wherein the organic hydrophilic coating layer comprises the following components (A), (B) and (C):

(A) at least one chitosan compound selected from the group consisting of chitosan and derivatives thereof;

(B) at least one carboxylic compound having at least two carboxyl groups per molecule thereof; and (C) at least one hydrophilic polymeric substance different from the above-mentioned compounds for the components (A) and (B), the components (A) and (B) in the organic hydrophilic coating layer being present in a total solid content of 20% by mass or more, and the component (C) in the organic hydrophilic coating layer being present in a solid content of 0.1 to 10% by mass.

In the aluminum alloy heat exchanger of the present invention, the chitosan derivatives for the component (A) are preferably selected from glycerylated chitosans.

In the aluminum alloy heat exchanger of the present invention, the carboxylic compound for the component (B) is preferably selected from the group consisting of oxalic acid, malonic acid, maleic acid, fumaric acid, succinic acid, malic acid, citric acid, tartaric acid, phthalic acid, itaconic acid, mellitic acid, trimellitic acid, trimesic acid, pyromellitic acid, naphthalenetetracarboxylic acid, propanedicarboxylic acid, butanedicarboxylic acid, pentanedicarboxylic acid, hexanedicarboxylic acid, heptanedicarboxylic acid, butanetricarboxylic acid, butanetetracarboxylic acid, cyclohexanetetracarboxylic acid, hexanetricarboxylic acid, acrylic acid polymers, methacrylic acid polymers and acrylic acid-methacrylic acid copolymers.

In the aluminum alloy heat exchanger of the present invention, the component (A) and the component (B) are preferably present in a solid mass ratio (A):(B) in the range of from 3:1 to 1:3, in the organic hydrophilic coating layer.

In the aluminum alloy heat exchanger of the present invention, the component (C) is present in a solid content of 0.1 to 5% by mass, in the organic hydrophilic coating layer.

In the aluminum alloy heat exchanger of the present invention, the hydrophilic polymeric substance for the component (C) is preferably selected from the group consisting of natural proteins, alginate salts, starch and modification products thereof, cellulose compounds, vinyl acetate polymers and copolymers and saponification products thereof, alkyleneoxide polymers and copolymers, water-soluble polyester resins, (meth)acrylamide resins, N-vinyl carboxylic acid amide resins, water-soluble polyamide resins, (meth) arylic copolymer resins, saponification products of acrylonitrile polymers, hydroxyethyl (meth)acrylate resins, vinyl pyrrolidone resins and cross-linking products of the above-mentioned polymeric substances.

The aluminum alloy heat exchanger of the present invention optionally further comprises an undercoat layer formed between the surface of the base body of the aluminum alloy heat exchanger and the organic hydrophilic coating layer and comprising at least one member selected from chromate compounds, zirconium compounds, titanium compounds and organic coating materials.

BEST MODE OF CARRYING OUT THE INVENTION

Figure 1:
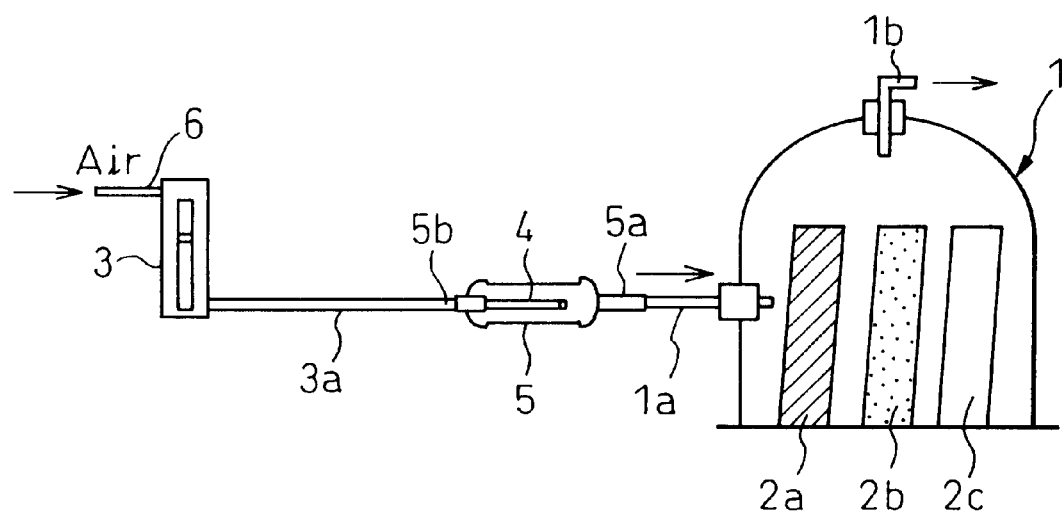
FIG. 1 is an explanatory front view of an apparatus for testing an absorption of odorous components of tobacco by a coated fin of a heat exchanger.

The aluminum alloy heat exchanger of the present invention comprises a base body made from an aluminum alloy usable for the heat exchanger, and an organic hydrophilic coating layer formed on at least a portion of the surface of the heat exchanger base body and comprising a component (A) comprising at least one chitosan compound selected from chitosan and derivatives thereof, a component (B) comprising at least one carboxylic compound having two or more carboxyl groups per molecule of the compound, and a component (C) comprising at least one hydrophilic polymeric substance different from the above-mentioned compounds for the components (A) and (B). In the organic hydrophilic coating layer, the components (A) and (B) are present in a total content of 20% by mass or more, and the component (C) is present in a solid content of 0.1 to 10% by mass. The aluminum alloy heat exchanger exhibits a significantly reduced absorption of odorous components of tobacco and other odorous materials.

The chitosan compound usable for the component (A) of the coating layer is selected from chitosan and derivatives thereof. Chitosan is produced by deacetylating chitin ($\beta$-1, 4-poly(N-acetyl-D-glucosamine)) which is a polysaccharide compound, namely $\beta(1\rightarrow 4)$ bonded N-acetyl-$\beta$-D-glucosamine. The chitosan derivatives are preferably selected from glycerylated chitosans. The glycerylated chitosans preferably have a degree of glycerylation of 2:1 to 1:2. The glucerylated chitosans are preferably employed to assuredly impart high hydrophilicity to the coating layer.

The carboxylic compound for the component (B) must be reactive with the chitosan compound of the component (A) having amino groups or hydroxyl groups to cross-link the chitosan compound molecules therethrough and to provide a water resistant cross-linked molecular network structure in the coating layer.

The carboxylic compound for the component (B) must have two or more carboxylic groups per molecule thereof and is preferably selected from, for example, oxalic acid, malonic acid, maleic acid, fumaric acid, succinic acid, malic acid, tartaric acid, citric acid, phthalic acids, itaconic acid, mellitic acid, trimellitic acid, trimesic acid, pyromellitic acid, naphthalenetetracarboxylic acid, propanedicarboxylic acid, butanedicarboxylic acid, pentanedicarboxylic acid, hexanedicarboxylic acid, heptanedicarboxylic acid, butanetricarboxylic acid, butanetetracarboxylic acid, cyclohexanetetracarboxylic acid, hexanetricarboxylic acid, acrylic acid polymers, methacrylic acid polymers and acrylic acid-methacrylic acid copolymers. To assuredly impart a high hydrophilicity to the coating layer, citric acid which has polar groups in addition to the carboxyl group and tri or more basic acids, for example, mellitic acid and butanetetracarboxylic acid, are more preferably employed.

In the heat exchanger of the present invention, the coating layer formed on at least a portion of the base body of the heat exchanger must have a total solid content of the components (A) and (B) of 20% by mass or more based on the total mass amount of the coating layer. If the total solid content ((A)+(B)) is less than 20% by mass, the reduction effect of the resultant coating layer on the absorption of the odorous components of tobacco and other odorous materials is unsatisfactory.

Also, with respect to the contents of the components (A) and (B) in the coating layer, preferably the ratio (A)/(B) in the content by mass of the component (A) to the component (B) is in the range of from 3:1 to 1:3. The ratio (A)/(B) in the range of from 3:1 to 1:3 is preferable to obtain the coating layer having a satisfactory water resistance.

In the aluminum alloy heat exchanger of the present invention, the organic hydrophilic coating layer further comprises, in addition to the above-mentioned components (A) and (B), a component (C) comprising at least one hydrophilic polymeric substance different from the compounds for the components (A) and (B).

The solid content of the component (C) is 0.1 to 10% by mass, preferably 1.0 to 5% by mass, based on the total solid mass of the organic hydrophilic coating layer. The hydrophilic polymeric substance for the component (C) contributes to further enhancing the hydrophilicity of the organic hydrophilic coating layer and the prevention effect of the coating layer on the absorption of the odorous substances. If the solid content of the component (C) is less than 0.1% by mass, the resultant coating layer exhibit insufficient hydrophilicity and prevention effect on the absorption of the odorous substances. Also, if the solid content of the component (C) is more than 10% by mass, the prevention effect of the resultant coating layer on the absorption of the odorous substances is insufficient.

The hydrophilic polymeric substances for the component (C) are not limited to specific types of substances as long as the substances is compatible with the components (A) and (B) contained in a composition for forming the coating layer. Preferably, the hydrophilic polymeric substances for the component (C) are selected from the group consisting of natural proteins, for example, gelatin, casein and soybean protein, alginate salts, starch and starch derivatives, for example, starch ethers, for example, starch-carboxymethylether, starch hydroxy-ethylether and starch-hydroxypropylether, and starch esters, for example, starch phosphate ester and starch nitrate ester, cellulose compounds, for example, methyl cellulose, carboxymethyl cellulose, hydroxyethyl cellulose, and methoxy cellulose, vinyl acetate polymers and copolymers and saponification products thereof, alkyleneoxide polymers and copolymers, water-soluble polyester resins, (meth)acrylamide resins, N-vinyl carboxylic acid amide resins, water-soluble polyamide resins, (meth)arylic copolymer resins, saponification products of acrylonitrile polymers, hydroxyethyl (meth) acrylate resins, vinyl pyrrolidone polymer and copolymer resins and cross-linking products of the above-mentioned polymeric substances.

The above-mentioned polyalkyleneoxide resins include, for example, polyethyleneoxide resins, ethyleneoxide-propyleneoxide copolymers and copolymers of ethyleneoxide and/or propyleneoxide with at least one ethylenically unsaturated comonomer different from ethyleneoxide and propyleneoxide. The different type ethylenically unsaturated comonomer is preferably selected from acrylic acid, methacrylic acid, itaconic acid, maleic acid, fumaric acid, crotonic acid, isocrotonic acid, 3-vinyl salicylic acid, 3-vinyl acetylsalicylic acid, p-vinylbenzenesulfonic acid, 2-acrylamidepropanesulfonic acid, styrenesulfonic acid, 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, vinyl alcohol, allyl alcohol, acrylamide, methacrylamide, N-methyl acrylamide, N-methyl methacrylamide, N,N-dimethyl acrylamide, N,N-dimethyl methacrylamide, N-ethyl acrylamide, N-ethyl methacrylamide, N-butyl acrylamide, N-butyl methacrylamide, dimethylaminoethyl acrylate, dimethylaminoethyl methacrylate, ethyleneimine, vinyl pyridine, vinylamine, allylamine, vinyl alcohol, vinyl pyrrolidone, glycidyl acrylate, glycidyl methacrylate, styrene, methylstyrene, vinyltoluene, butadiene, isoprene, chloroprene, acrylonitrile, methacrylonitrile, methyl acrylate, methyl methacrylate, ethyl acrylate, ethyl methacrylate, n-propyl acrylate, n-propyl methacrylate, isopropyl acrylate, and isopropyl methacrylate.

The above-mentioned water-soluble polyester resins include copolymers of polycarboxylic acids, for example, terephthalic acid, isophthalic acid, phthalic acid, adipic acid, succinic acid, sebacic acid and dodecanedicarboxylic acid, with polyhydric alcohols, for example, ethyleneglycol, propyleneglycol, 1,4-butanediol, 1,6-hexanediol, neopentylglycol, and cyclohexanedimethanol and hydrophilic monomers, for example, sodium 5-sulfoisophthalate, and polyethyleneglycol.

The above-mentioned (meth)acrylamide resins include polymers and copolymers of acrylamide and/or methacrylamide and copolymers of acrylamide and/or methacrylamide with at least one ethylenically unsaturated comonomers different from acrylamide and methacrylamide. The different type ethylenically unsaturated comonomers are preferably selected from acrylic acid, methacrylic acid, itaconic acid, maleic acid, fumaric acid, crotonic acid, isocrotonic acid, 3-vinyl salicylic acid, 3-vinyl acetylsalicylic acid, p-vinylbenzenesulfonic acid, 2-acrylamidepropanesulfonic acid, styrenesulfonic acid, 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, vinyl alcohol, allyl alcohol, N-methyl acrylamide, N-methyl methacrylamide, N,N-dimethyl acrylamide, N,N-dimethyl methacrylamide, N-ethyl acrylamide, N-ethyl methacrylamide, N-butyl acrylamide, N-butyl methacrylamide, dimethylaminoethyl acrylate, dimethylaminoethyl methacrylate, ethyleneimine, vinyl pyridine, vinylamine, allylaminevinyl alcohol, ethyleneglycol, vinyl pyrrolidone, glycidyl acrylate, glycidyl methacrylate, styrene, methylstyrene, vinyltoluene, butadiene, isoprene, chloroprene, acrylonitrile, methacrylonitrile, methyl methacrylate, methyl acrylate, ethyl acrylate, ethyl methacrylate, n-propyl acrylate, n-propyl methacrylate, isopropyl acrylate, and isopropyl methacry late.

The above-mentioned N-vinyl carboxylic acid amide resins include polymers of N-vinyl carboxylic acid amides, for example, N-vinyl formamide, N-vinyl acetamide, N-vinylpropionamide, N-(propenyl-2-yl)formamide, N-(propenyl-2-yl) acetamide and N-vinyl-2-pyrrolidone, and copolymers of the above-mentioned N-vinyl carboxylic acid amide with at least one ethylenically unsaturated comonomer different from the N-vinyl carboxylic acid amides. The different type ethylenically unsaturated comonomer is preferably selected from acrylic acid, methacrylic acid, itaconic acid, maleic acid, fumaric acid, crotonic acid, isocrotonic acid, 3-vinyl salicylic acid, 3-vinyl acetylsalicylic acid, p-vinylbenzenesulfonic acid, 2-acrylamidepropanesulfonic acid, styrenesulfonic acid, 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, vinyl alcohol, allyl alcohol, acrylamide, methacrylamide, N-methyl acrylamide, N-methyl methacrylamide, N,N-dimethyl acrylamide, N,N-dimethyl methacrylamide, N-ethyl acrylamide, N-ethyl methacrylamide, N-butyl acrylamide, N-butyl methacrylamide, dimethylaminoethyl acrylate, dimethylaminoethyl methacrylate, ethyleneimine, vinyl pyridine, vinylamine, allylaminevinyl alcohol, ethylene glycol, vinyl pyrrolidone, glycidyl acrylate, glycidyl methacrylate, styrene, methylstyrene, vinyltoluene, butadiene, isoprene, chloroprene, acrylonitrile, methacrylonitrile, methyl acrylate, methyl methacrylate, ethyl acrylate, ethyl methacrylate, n-propyl acrylate, n-propyl methacrylate, isopropyl acrylate, and isopropyl methacrylate.

The above-mentioned water-soluble polyamide is also referred to as water-soluble nylon resins. For example, the water-soluble polyamide resins include polyamides of diamine compounds having a tertiary amino group attached to a backbone chain thereof, for example, aminoethylpiperazine or bisaminopropylpiperazine with dicarboxylic acid compounds, for example, adipic acid or sebacic acid; copolymeric polyamides of the above-mentioned polyamides with lactam compounds; copolymeric polyamides of the above-mentioned polyamides with lactame compounds having a tertiary amino group-containing side chain, for example, α-dimethylamino-ε-caprolactam, (the above-mentioned polyamides are referred to as cationic nylons); non-ionic polyamides prepared from a diamine or a dicarboxylic acid prepared from polyethylene glycol having a molecular weight of 200 to 4000 with adipic acid or sebacic acid or a diamine, for example, hexamethylenediamine; and copolymeric polyamide prepared from the above-mentioned non-ionic polyamide with lactam compounds (the above-mentioned non-ionic polyamides are referred to as nonionic nylons, hereinafter).

The above-mentioned (meth)acrylic copolymer resins include copolymers of at least one specific acrylic compound selected from acrylic acid, methacrylic acid, acrylate esters and methacrylate esters with at least one ethylenically unsaturated comonomer different from the above-mentioned specific a acrylic compound. The different type ethylenically unsaturated comonomers are preferably selected from itaconic acid, maleic acid, fumaric acid, crotonic acid, isocrotonic acid, 3-vinyl salicylic acid, 3-vinyl acetylsalicylic acid, p-vinylbenzenesulfonic acid, 2-acrylamidepropanesulfonic acid, styrenesulfonic acid, vinyl alcohol, allyl alcohol, acrylamide, methacrylamide, N-methyl acrylamide, N-methyl methacrylamide, N,N-dimethyl acrylamide, N,N-dimethyl methacrylamide, N-ethyl acrylamide, N-ethyl methacrylamide, N-butyl acrylamide, N-butyl methacrylamide, ethyleneimine, vinyl pyridine, vinylamine, allylaminevinyl alcohol, ethyleneglycol, vinyl pyrrolidone, styrene, methylstyrene, vinyltoluene, butadiene, isoprene, chloroprene, acrylonitrile and methacrylonitrile.

The above-mentioned saponification products of polyacrylonitrile resins include perfect and partial saponification products of polyacrylonitrile resins and perfect and partial saponification products of copolymers of acrylonitrile with at least one ethylenically unsaturated comonomers different from acrylonitrile. The above-mentioned different type ethylenically unsaturated comonomers are preferably selected from acrylic acid, methacrylic acid, itaconic acid, maleic acid, fumaric acid, crotonic acid, isocrotonic acid, 3-vinyl salicylic acid, 3-vinyl acetylsalicylic acid, p-vinylbenzenesulfonic acid, 2-acrylamidepropanesulfonic acid, styrenesulfonic acid, 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, vinyl alcohol, allyl alcohol, acrylamide, methacrylamide, N-methyl acrylamide, N-methyl methacrylamide, N,N-dimethyl acrylamide, N,N-dimethyl methacrylamide, N-ethyl acrylamide, N-ethyl methacrylamide, N-butyl acrylamide, N-butyl methacrylamide, dimethylaminoethyl acrylate, dimethylaminoethyl methacrylate, ethyleneimine, vinyl pyridine, vinylamine, allylaminevinyl alcohol, ethyleneglycol, vinyl pyrrolidone, glycidyl acrylate, glycidyl methacrylate, styrene, methylstyrene, vinyltoluene, butadiene, isoprene, chloroprene, methacrylonitrile, methyl acrylate, methyl acrylate, ethyl acrylate, ethyl methacrylate, n-propyl acrylate, n-propyl methacrylate, isopropyl acrylate, and isopropyl methacrylate.

The above-mentioned hydroxyethyl (meth)acrylate resins include homopolymers and copolymers of hydroxyethyl acrylate and hydroxyethyl methacrylate, and copolymers of at least one member of hydroxyethyl acrylate and hydroxyethyl methacrylate with at least one ethylenically unsaturated comonomer different from hydroxyethyl acrylate and hydroxyethyl methacrylate.

The different type ethylenically unsaturated comonomer is preferably selected from acrylic acid, methacrylic acid, itaconic acid, maleic acid, fumaric acid, crotonic acid, isocrotonic acid, 3-vinyl salicylic acid, 3-vinyl acetylsalicylic acid, p-vinylbenzenesulfonic acid, 2-acrylamidepropanesulfonic acid, styrenesulfonic acid, 2-hydroxypropyl acrylate, 2-hydroxybutyl acrylate, 2-hydroxypropyl methacrylate, 2-hydroxybutyl methacrylate, vinyl alcohol, allyl alcohol, acrylamide, methacrylamide, N-methyl acrylamide, N-methyl methacrylamide, N,N-dimethyl acrylamide, N,N-dimethyl methacrylamide, N-ethyl acrylamide, N-ethyl methacrylamide, N-butyl acrylamide, N-butyl methacrylamide, dimethylaminoethyl acrylate, dimethylaminoethyl methacrylate, ethyleneimine, vinyl pyridine, vinylamine, allylaminevinyl alcohol, ethyleneglycol, vinyl pyrrolidone, glycidyl acrylate, glycidyl methacrylate, styrene, methylstyrene, vinyltoluene, butadiene, isoprene, chloroprene, acrylonitrile, methacrylonitrile, methyl acrylate, methyl acrylate, ethyl acrylate, ethyl methacrylate, n-propyl acrylate, n-propyl methacrylate, isopropyl acrylate, and isopropyl methacrylate.

The above-mentioned vinyl pyrrolidone copolymers include copolymers of vinyl pyrrolidone with at least one ethylenically unsaturated comonomer different from vinyl pyrrolidone. The different type ethylenically unsaturated comonomer is preferably selected from acrylic acid, methacrylic acid, itaconic acid, maleic acid, fumaric acid, crotonic acid, isocrotonic acid, 3-vinyl salicylic acid, 3-vinyl acetylsalicylic acid, p-vinylbenzenesulfonic acid, 2-acrylamidepropanesulfonic acid, styrenesulfonic acid, 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, vinyl alcohol, allyl alcohol, acrylamide, methacrylamide, N-methyl acrylamide, N-methyl methacrylamide, N,N-dimethyl acrylamide, N,N-dimethyl methacrylamide, N-ethyl acrylamide, N-ethyl methacrylamide, N-butyl acrylamide, N-butyl methacrylamide, dimethylaminoethyl acrylate, dimethylaminoethyl methacrylate, ethyleneimine, vinyl pyridine, vinylamine, allylaminevinyl alcohol, ethylene glycol, glycidyl acrylate, glycidyl methacrylate, styrene, methylstyrene, vinyltoluene, butadiene, isoprene, chloroprene, acrylonitrile, methacrylonitrile, methyl acrylate, methyl acrylate, ethyl acrylate, ethyl methacrylate, n-propyl acrylate, n-propyl methacrylate, isopropyl acrylate, and isopropyl methacrylate.

In the organic hydrophilic coating layer of the present invention, preferably, (meth)acrylic copolymer resins, vinyl acetate resins and perfect and partial saponification products thereof and water-soluble polyamide resins are preferably employed as hydrophilic polymeric substances for the component (C).

The organic hydrophilic coating layer of the present invention optionally further comprises, in addition to the components (A), (B) and (C), a surfactant, to further enhance the hydrophilicity of the coating layer. Also, for the purpose of preventing proliferation of bacteria and fungi, an antibacterial agent and/or antifungus agent is further contained in the coating layer.

Also, optionally, for purpose of enhancing the reduction effect of the coating layer on the absorption or impregnation of odorous components of tobacco or other odorous materials, or of reducing the odor of the coating layer per se, a deodorizer can be contained in the coating layer, as long as the purpose of the present invention can be attained.

The method of forming the organic hydrophilicic coating layer on the surface of the base body of the heat exchanger will be explained below.

The surface of the base body of the heat exchanger is cleaned with a solvent-type cleaning agent or alkaline or acid type aqueous detergent. If the base body surface is clean, the cleaning procedure may be omitted. The clean surface of the base body of the heat exchanger is optionally undercoat-treated with a known chromate-treating agent, iron phosphate-coating liquid, zinc phosphate-treating liquid, titanium or zirconium-containing treating liquid or an organic coating liquid to enhance corrosion resistance and/or coating layer-adhesion of the base body surface. Then, the base body surface is coated with a coating liquid of a composition comprising the components (A), (B) and (C) for forming the organic hydrophilic coating layer, by a spraying, dipping, roll-coating, or shower-coating method, and the coated coating liquid layer is dried to form the coating layer. The dry coating layer is preferably in an amount of 0.05 to 5 g/m$^2$, more preferably 0.1 to 2.0 g/m$^2$. If the amount of the coating layer is less than 0.05 g/m$^2$, the resultant coating layer exhibits an unsatisfactory reduction effect in odorous component-absorption or impregnation of tobacco or other odorous materials and insufficient hydrophilicity. If the coating layer amount is more than 5 g/m$^2$, it is difficult to uniformly form the coating layer, and this is economically unadvantageous.

The clean surface of the base body of the aluminum alloy heat exchanger is preferably undercoated by at least one undercoating treatment selected from chromate surface treatments, zirconium surface treatments, titanium surface treatments and organic surface coating treatments. The undercoat treatment contributes to enhancing corrosion resistance of the heat exchanger and intimate adhesion between the base body surface and the organic hydrophilic coating layer of the heat exchanger. For the chromate surface treatments, chromating agents, for example, chromic acid chromating agents phosphoric acid chromating agents and alkali chromating agents, etc. are employed. For the zirconium surface treatments, conventional zirconium chemical conversion treatment agents, for example, zirconium phosphate, zirconium oxide, vanadium-zirconium, manganese-zirconium, resin-zirconium, tannic acid-zirconium, phytic acid-zirconium conversion treatment agents are employed. For the titanium surface treatments, conventional titanium chemical conversion treatment agents, for example, titanium phosphate, titanium dioxide, vanadium-titanium, resin-titanium, tannic acid-titanium and phytic acid-titanium chemical conversion treatment agents are employed. For the organic resin surface coating treatments, conventional resin coating agents, for example, polyacrylic resins, polyurethane resins and epoxy resins and mixture of the above-mentioned resins with metal salts, for example, fluorozirconium compounds and fluorotitanium compounds, are employed.

EXAMPLES

The present invention will be further explained by the following examples.

In the examples and comparative examples, the following procedures were carried out.

(1) Cleaning and Undercoating Treatments of Base Material of Heat Exchanger

An aluminum alloy base body for heat exchanger was immersed in an aqueous cleaning liquid containing 30 g/liter of an weak alkaline degreasing agent (trademark: Finecleaner 315, made by Nihon Parkerizing Co.) and kept at a temperature of 60° C. for 90 seconds, to remove stains such as greasy materials on the base body surface, and rinsed with city water for 30 minutes. Then the surface-cleaned base body was immersed in a chromate treating liquid containing 72 g/liter of chromic acid-chromating agent (trademark: Alchrom 713, made of Nihon Parkerizing Co.) and kept at a temperature of 50° C. for 60 seconds, and then rinsed with city water for 30 seconds, to form an undercoat layer on the base body.

(2) Formation of Organic Hydrophilic Coating Layer

The undercoated aluminum alloy base body of the heat exchanger was coated with an organic hydrophilic coating layer by the procedures as described in each of the following examples and comparative examples.

In all of the examples and comparative examples, the contents of components in the compositions for the coating layer are based on solid mass.

Example 1

The undercoated aluminum alloy base body for the heat exchanger was immersed in a coating liquid having the composition shown below at room temperature for 30 seconds, and the resultant coating liquid layer on the base body surface was dried and heat treated in an electric oven at a temperature of 145° C. for 30 minutes, to form a hydrophilic coating layer.

| Coating liquid composition | |
|---|---|
| Glycerylated chitosan (degree of glycerylation: 1.3) | 6.0 g/liter |
| Citric acid (First grade) | 6.0 g/liter |
| Cationic water-soluble polyamide | 0.3 g/liter |

-continued

| Coating liquid composition | |
|---|---|
| (trademark: AQ NYLON T-70, made by TORAY K.K.) | |
| Water | Balance |

Example 2

The undercoated aluminum alloy base body for the heat exchanger was immersed in a coating liquid having the composition shown below at room temperature for 30 seconds, and the resultant coating liquid layer on the base body surface was dried and heat treated in an electric oven kept at a temperature of 180° C. for 30 minutes, to form a hydrophilic coating layer.

| Coating liquid composition | |
|---|---|
| Glycerylated chitosan (degree of glycerylation: 1.1) | 3.0 g/liter |
| Citric acid (First grade) | 5.0 g/liter |
| Polyethylene glycol (Molecular weight: about 20.000) | 0.4 g/liter |
| Surfactant (Nonylphenyl-(EO)$_{20}$ addition product) | 1.0 g/liter |
| Water | Balance |

Example 3

The undercoated aluminum alloy base body for the heat exchanger was immersed in a coating liquid having the composition shown below at room temperature for 30 seconds, and the resultant coating liquid layer on the base body surface was dried and heat treated in an electric oven at a temperature of 145° C. for 30 minutes, to form a hydrophilic coating layer.

| Coating liquid composition | |
|---|---|
| Chitosan | 3.0 g/liter |
| Mellitic acid | 4.0 g/liter |
| Polyacrylamide (MW: about 25.000) | 1.0 g/liter |
| 1,2-benzoisothiazoline-3-one (antibacterial agent) | 3.0 g/liter |
| Water | Balance |

Comparative Example 1

The undercoated aluminum alloy base body for the heat exchanger was immersed in a coating liquid having the composition shown below at room temperature for 30 seconds, and the resultant coating liquid layer on the base body surface was dried and heat treated in an electric oven at a temperature of 145° C. for 30 minutes, to form a hydrophilic coating layer.

| Coating liquid composition | |
|---|---|
| Hydroxypropylcellulose | 6.0 g/liter |
| Citric acid (First grade) | 6.0 g/liter |
| Water | Balance |

Comparative Example 2

The undercoated aluminum alloy base body for the heat exchanger was immersed in a coating liquid having the composition shown below at room temperature for 30 seconds, and the resultant coating liquid layer on the base body surface was dried and heat treated in an electric oven at a temperature of 145° C. for 30 minutes, to form a hydrophilic coating layer.

| Coating liquid composition | |
|---|---|
| Chitosan | 6.0 g/liter |
| Phosphoric acid (First grade) | 6.0 g/liter |
| Water | Balance |

Comparative Example 3

The undercoated aluminum alloy base body for the heat exchanger was immersed in a coating liquid having the composition shown below at room temperature for 30 seconds, and the resultant coating liquid layer on the base body surface was dried and heat treated in an electric oven at a temperature of 145° C. for 30 minutes, to form a hydrophilic coating layer.

| Coating liquid composition | |
|---|---|
| Glycerylated chitosan (degree of glycerylation: 1.3) | 1.0 g/liter |
| Mellitic acid | 1.0 g/liter |
| Hydroxypropylcellulose | 10.0 g/liter |
| Water | Balance |

Comparative Example 4

The undercoated aluminum alloy base body for the heat exchanger was immersed in a coating liquid having the composition shown below at room temperature for 30 seconds, and the resultant coating liquid layer on the base body surface was dried and heat treated in an electric oven at a temperature of 145° C. for 30 minutes, to form a hydrophilic coating layer.

| Coating liquid composition | |
|---|---|
| Glycerylated chitosan (degree of glycerylation: 1.3) | 6.0 g/liter |
| Acetic acid (First grade) | 6.0 g/liter |
| Water | Balance |

Comparative Example 5

The same aluminum alloy base body of heat exchanger as used in Example 1 was coated by the following procedures as disclosed in Japanese Unexamined Patent Publication No. 9-14889, Example 1, to form a coating layer.

A base body made of an aluminum alloy for a heat exchanger was immersed in an aqueous solution of 30 g/liter of a weak alkaline degreasing agent (trademark: Finecleaner 315, made by Nihon Parkerizing Co.) kept at a temperature of 60° C. for 50 seconds to remove staining material such as greasy materials on the surface, and rinsed with city water for 30 seconds. Then, the cleaned base body was immersed in an aqueous treating liquid containing 72 g/liter of chromic acid-chromating agent (trademark: Alchrom 713, made by Nihon Parkerizing Co.) and kept at a temperature of 50° C. for 60 seconds, and rinsed with city water for 30 seconds, to form a first protecting layer on the base body surface.

The first protecting layer surface of the base body was immersed in an aqueous treating liquid containing 100 parts by mass of polyacrylamide (made by Daiichi Kogyoseiyaku K.K.), 110 parts by mass of polyvinylsulfonic acid (made by Nihon Shokubai K.K.), 40 parts by mass of a nonionic water-soluble nylon having polyethyleneoxide groups in molecular skeleton thereof (made by Toray K.K.) and 10 parts by mass of a cross-linking agent consisting of chromium biphosphate, at a temperature of 25° C. for 30 seconds, and the treating liquid layer on the base body surface was subjected to an air blow treatment, and then dried and heat treated in a hot air circulation dryer at a temperature of 140° C. for 20 minutes, to form a second protecting layer.

Comparative Example 6

The undercoated aluminum alloy base body for the heat exchanger was immersed in a coating liquid having the composition shown below at room temperature for 30 seconds, and the resultant coating liquid layer on the base body surface was dried and heat treated in an electric oven at a temperature of 145° C. for 30 minutes, to form a hydrophilic coating layer.

| Coating liquid composition | |
|---|---|
| Glycerylated chitosan (degree of glycerylation: 1.3) | 6.0 g/liter |
| Succinic acid (First grade) | 6.0 g/liter |
| Water | Balance |

Tests and Evaluations

The heat exchangers obtained in each of Examples 1 to 3 and Comparative Examples 1 to 6 were subjected to the following tests and evaluations.

(1) Absorption or Impregnation of Odorous Components of Tobacco

Figure 2:
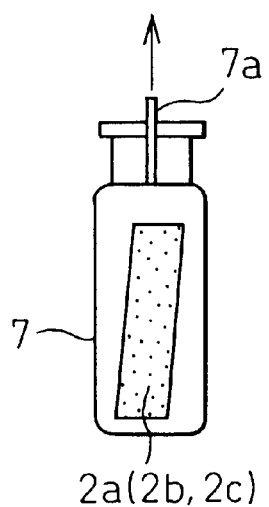
FIG. 2 is an explanatory front view of a GC-MS analyzer for evaporized substances.

A testing apparatus shown in FIGS. 1 and 2 for absorption or impregnation of odorous components of tobacco was employed.

As shown in FIG. 1, the testing apparatus has a bell-shaped glass 1 container for containing therein specimens 2a, 2b, and 2c, a smoking cylinder 5 containing therein a cigarette 4 and having an outlet 5a connected to the bell-shaped container 1 through a conduit 1a and an inlet 5b, and a flow meter 3 connected to the inlet 5b of the smoking cylinder 5 through a conduit 3a, and a fresh air-supply conduit 6 connected to the smoking cylinder 5.

Generally, one or more specimens are contained in the bell-shaped container 1, and air is blown into the smoking cylinder 5 at a predetermined flow rate through the conduit 6 and flow meter 3, conduit 3a and inlet 5b, to smoke the cigarette 4. The resultant smoke containing odorous components of tobacco is blown into the container 1 through the outlet 5a and conduit 1a. The odorous components are absorbed by or impregnated in the specimen, and the remaining smoke is removed from the container through an outlet 1b.

The specimen is placed in a GC-MS analyzer as shown in FIG. 2, and an amount of evaporated substance from the specimen is measured by GC-MS analysis.

In this test, coated fins 2a of Examples 1 to 3, coated fins 2b of Comparative Examples 1 to 4 and a coated fin 2c of Comparative Example 5, in total 8 coated fins, were placed in the bell-shaped container, and exposed to tobacco smoke, in the manner as described above, until the cigarette was used up. Each of the specimens 2a, 2b and 2c was placed in a GC-MO analyzer 7 having an opening 7a as shown in FIG. 2, and subjected to GC-MS analysis. The odorous component-absorption or impregnation of each specimen was represented by the amount of the substance evaporated from the specimen. Also, the amount of the substance evaporated from specimen 2c (Comparative Example 5) was represented as 1.0, as standard, and the evaporation amounts of other specimens 2a and 2b were represented by values relative to that of the specimen 2c. The results are shown in Table 1.

(2) Initial Hydrophilicity

The contact angle of each specimen (coated fin) with water was measured by using a FACE contact angle meter (Model CA-P, made by Kyowa Kaimenkagaku K.K.). The results are shown in Table 1.

(3) Durability of Hydrophilicity

Each specimen (coated fin) was immersed in a water stream at room temperature for 72 hours, and then the contact angle of each specimen with water was measured by using the above-mentioned contact angle meter. The results are shown in Table 1.

TABLE 1

| | | Item | | | | |
|---|---|---|---|---|---|---|
| | | Solid contents of components (A), (B) and (C) (% by mass) | | Absorption (or impregnation) of odorous components of | Contact angle with water (degrees) | |
| Example No. | | (A) + (B) | (C) | tobacco | Initial | After duration treatment |
| Example | 1 | 97.6 | 2.4 | 0.41 | 7 | 20 |
| | 2 | 85.1 | 4.3 | 0.55 | 5 | 25 |
| | 3 | 63.6 | 9.1 | 0.76 | 9 | 17 |
| Comparative Example | 1 | — | 50.0 | 1.38 | 32 | 41 |
| | 2 | — | — | 0.95 | 7 | 68 |
| | 3 | 16.7 | 83.3 | 1.07 | 14 | 43 |
| | 4 | — | — | 0.93 | 4 | 62 |
| | 5 | — | 96.2 | 1.00(*) | 6 | 20 |
| | 6 | 100 | — | 0.95 | 11 | 46 |

Note:
(*)Standard

When the absorption or impregnation of the odorous components of tobacco in the coated fin of Comparative Example 5 according to a conventional art is represented as 1.0, the odorous component absorptions of the coated fins according to the present invention were 0.41 in Example 1, 0.55 in Example 2 and 0.76 in Example 3. In other words, the coated heat exchangers of the present invention had a high resistance to absorption or impregnation of the odorous components of tobacco and exhibited high initial hydrophilicity and a high durability of the hydrophilicity.

Compared with Examples 1 to 3 according to the present invention, in Comparative Example 1, the coating layer contained no component (A) and exhibited a high absorption of tobacco odorous components of 1.38, which is higher than that of Comparative Example 5 in a conventional art, and low hydrophilicity.

In Comparative Example 2, the coating layer contained no component (B) and was soluble in water. Thus, while the absorption of tobacco odorous components was less than 1, the resistance to absorption of tobacco odorous components was insufficient, and the durability of hydrophilicity of the coated heat exchanger was very poor, because the coating layer was removed by the water stream.

In Comparative Example 3, the total content of the components (A) and (B) was less than 20% by mass, based on the total mass of the coating layer, and the resistance of the coating layer to the absorption of tobacco odorous components was low, similarly to that of Comparative Example 1.

In Comparative Example 4, the carboxylic compound in component (B) had only one carboxyl group per molecule thereof, and the properties of the resultant coating layer were similar to those of Comparative Example 2.

Comparative Example 5 was carried out to provide a conventional coated heat exchanger as a standard.

In Comparative Example 6, while the absorption of the tobacco odorous components by the coating layer was less than 1.0, the resistance of the coating layer to the absorption of the tobacco odorous component was unsatisfactory and the hydrophilicity of the coating layer was insufficient.

INDUSTRIAL APPLICABILITY

As is clear from the above description, the aluminum alloy heat exchanger according to the present invention, in which the surface of the base body is coated with a specific coating layer, exhibits excellent resistance to absorption, sticking or impregnation of odorous substances, for example, odorous components of tobacco, and high hydrophilicity and a high durability of the hydrophilicity, and thus is useful in practice.

What is claimed is:

1. An aluminum alloy heat exchanger resistive to tobacco odor impregnation, comprising a base body of an aluminum alloy heat exchanger and an organic hydrophilic coating layer formed on at least a portion of the surface of the base body, wherein the organic hydrophilic coating layer comprises the following components (A), (B) and (C):

(A) at least one chitosan compound selected from the group consisting of chitosan and derivatives thereof;

(B) at least one carboxylic compound selected from the group consisting of citric acid, mellitic acid, trimellitic acid, trimesic acid, pyromellitic acid, naphthalenetetracarboxylic acid, butanetricarboxylic acid, butanetetracarboxylic acid, cyclohexanetetracarboxylic acid, and hexanetricarboxylic acid; and (C) at least one hydrophilic polymeric substance different from the above-mentioned compounds for the components (A) and (B), components (A) and (B) in the organic hydrophilic coating layer being present in a total solid content of 20% by mass or more, component (C) in the organic hydrophilic coating layer being present in a solid content of 0.1 to 10% by mass, and component (A) being reacted with component (B) to thereby cross-link the molecules of component (A) through the carboxylic compound having three or more carboxyl groups per molecule thereof, to provide a water resistant cross-linked molecular network structure in the coating layer.

2. The aluminum alloy heat exchanger as claimed in claim 1, wherein the chitosan derivatives for component (A) are selected from glycerylated chitosans.

3. The aluminum alloy heat exchanger as claimed in claim 1 wherein, in the organic hydrophilic coating layer, component (A) and component (B) are present in a solid mass ratio (A):(B) in the range of from 3:1 to 1:3.

4. The aluminum alloy heat exchanger as claimed in claim 1 wherein, in the organic hydrophilic coating layer, component (C) is present in a solid content of 0.1 to 5% by mass.

5. The aluminum alloy heat exchanger as claimed in claim 1, wherein the hydrophilic polymeric substance for component (C) is selected from the group consisting of natural protein, alginate salts, starch and modification products thereof, cellulose compounds, vinyl acetate polymers and copolymers and saponification products thereof, alkyleneoxide polymers and copolymers, water-soluble polyester resins (meth)acrylamide resins, N-vinyl carboxylic acid amide resins, water-soluble polyamide resins, (meth)arylic copolymer resins, saponification products of acrylonitrile polymers, hydroxyelthyl (meth)acrylate resins, vinyl pyrrolidone resins and cross-linking products of the above-mentioned polymeric substances.

6. The aluminum alloy heat exchanger as claimed in claim 1, further comprising an undercoat layer formed between the surface of the base body of the aluminum alloy heat exchanger and the organic hydrophilic coating layer and comprising at least one member selected from chromate compounds, zirconium compounds, titanium compounds and organic coating materials.

* * * * *